G. W. BURTON.
LOCKING DEVICE.
APPLICATION FILED NOV. 28, 1919.
1,349,491.  Patented Aug. 10, 1920.
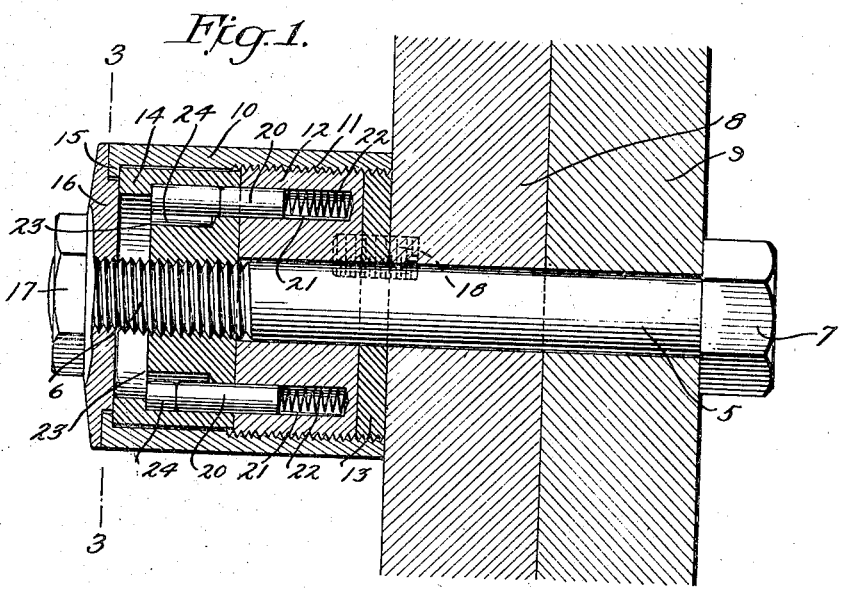
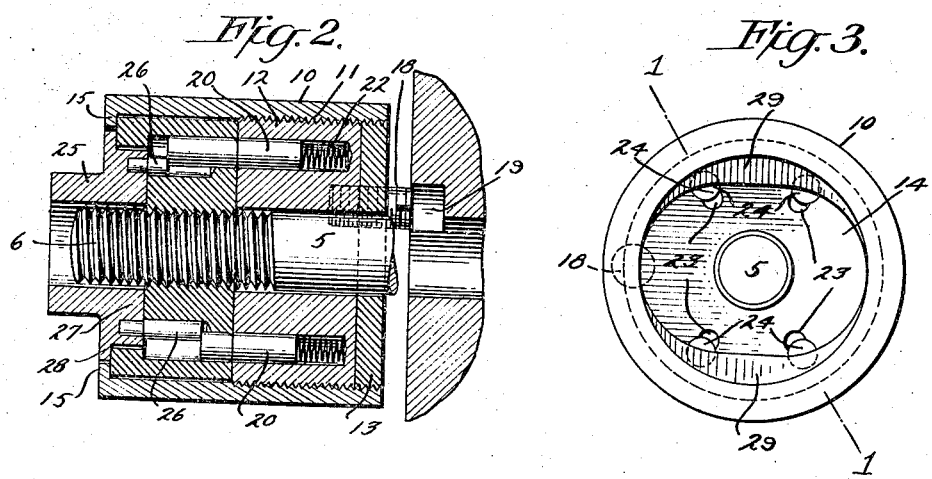
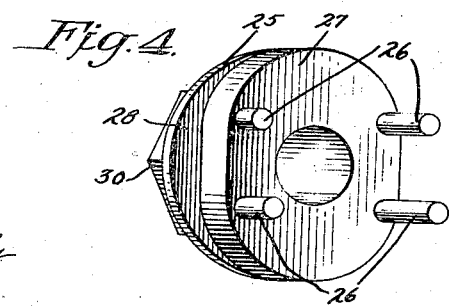
WITNESSES
INVENTOR
GEORGE W. BURTON.
BY
ATTORNEYS

UNITED STATES PATENT OFFICE.

GEORGE W. BURTON, OF PROVIDENCE, RHODE ISLAND.

LOCKING DEVICE.

1,349,491.   Specification of Letters Patent.   Patented Aug. 10, 1920.

Application filed November 28, 1919. Serial No. 341,130.

*To all whom it may concern:*

Be it known that I, GEORGE W. BURTON, a subject of the King of Great Britain, and a resident of Providence, county of Providence, and State of Rhode Island, have invented a new and useful Locking Device, of which the following is a full, clear, and exact description.

The present invention relates to a locking device and has reference more particularly to a locking device which in many respects embodies some of the characteristics of a nut lock, although its salient features are in no way represented by a nut lock except that in its preferred form the device is intended to be associated with a bolt or spindle which is threaded at one end, and in which such threaded end is received by the lock device, with the device confining and locking a structure on the bolt or spindle.

In instances where it is desirable to employ a locking device for confining different structures on a mounting or support in which a spindle or bolt with a threaded end is employed, it is important where the structure confined on the bolt or spindle is to be accessible and readily removed, to employ some locking device that may be removed from the bolt or spindle as many times as desirable without destroying the locking qualities of the device, and with these conditions to be considered the present invention has for an object to provide a device which will meet the requirements above stated and provide a practical solution of the problem.

Spare tires for motor vehicles are sometimes carried on a demountable wheel, which in turn is supported on the rear or side of the motor vehicle with the axle housing of the wheel providing an opening through which a bolt or spindle is passed. Now in such instances as this, the present invention could be used to advantage in that the end of the bolt or spindle can be threaded with the device engaging the same and locking the wheel on the bolt or spindle, and in this manner provide an anti-theft device.

The utility of the device proposed by the invention is in no way limited to the use just mentioned, but its advantages may be readily realized in many instances therefore the illustrative embodiment in the accompanying drawing is not confined to any particular arrangement in so far as its use is concerned, but merely as an example of the broad application of the idea.

In said drawing Figure 1 is a sectional view on the line 1—1 of Fig. 3, and showing the parts of the device as in locking position.

Fig. 2 is a section showing the key as used with the device for releasing the locking means.

Fig. 3 is a front section with the cover removed and without the key engaged therein, and Fig. 4 is a perspective view of the key.

Referring to the drawings in detail it will be assumed that the bolt 5 may be a spindle or any other kind of rod having a threaded end 6 between which and the head 7 a structure is to be confined and locked on the bolt or spindle. The members shown as 8 and 9 represent a structure which is adapted to be locked on the bolt or spindle 5. To accomplish this locking arrangement in accordance with the preferred embodiment of the invention the cylindrical casing 10 is employed, which is internally threaded on one end as at 11, and made to receive a threaded annular ring 12, in which is provided an axial bore, and through which the bolt or spindle 5 is passed. An annular disk shaped plate 13 having a threaded periphery is also threaded in the cylindrical casing 10 behind the ring 12 closing the end of the casing with the face of the plate lying flush with the edge of the casing. Before the ring 12 or the disk shaped plate 13 is threaded into the casing the annular ring 14 is first introduced into the front part of the casing and confined between the ring 12 and the annular flange 15 surrounding the front opening in the casing. This annular ring 14 is also provided with an axial bore which is of a smaller diameter than the bore in the ring 12 and instead of being plain as in the bore of the ring 12 it is threaded to receive the threaded ends 6 of the bolt or spindle 5, which is passed therethrough with its end projecting beyond the bore and even beyond the opening in the front of the casing. A cover comprising a dish shaped piece 16 having a nut 17 fixed thereto and also provided with an axial bore is made to engage the extreme front end of the bolt or spindle 5 to close the parts just described within the casing.

A threaded opening is provided in the disk shaped plate 13 and the back of the annular ring 12 of the said opening being positioned off center and made to receive the set screw 18 with the end thereof protruding outwardly from the face of the plate 13 so that the same may be received in an opening such as 19 in the structure to be confined on the bolt or spindle or in a block or the like associated with the device.

It will be seen from the above that while the annular ring 12 by means of its threaded engagement with the casing is not capable of a normal rotation in the casing, the annular ring 14 having no threaded engagement with the casing may be rotated therein. However, when the parts are in locked position the series of pins 20 which are slidably mounted in the longitudinal recesses 21, by means of the springs 22, will be pushed out of the recess 21 and into recesses in the ring 14, whereby the ring 14 and the ring 12 will be locked together in so far as concerns any rotary movement. The recesses in the ring 14 are arranged to correspond in number to the series of pins 21 and for a part of their length they are enlarged in diameter as at 23, the purpose of which will be presently described. Further concerning these recesses it should be noted that they also carry pins 24 which are made to abut against the ends of the series of pins 20 so that the pins may be pushed against the influence of the springs 22 and made to recede in the recesses 21, whereby they may be confined therein, thus releasing the ring 14 in so far as concerns its locking engagement with the ring 12. When this condition is to be brought about the cover 16 is removed and by means of an individual key device such as shown in Fig. 2 and represented as 25, which is provided with studs 26, is inserted over the end of the bolt or spindle with the studs 26 received in the enlarged portion 23 of the recesses in the annular ring 14, whereby the studs 26 may abut against the pins 24 and impart the necessary sliding movement to the pins 20.

The front face of the ring 14 is dished out to provide an oval shaped opening best shown in Fig. 3 and the key device 25 is provided with an oval shaped block 27 so that introducing the studs 26 into the recesses 23 for manipulating the pins 24 and in turn the pins 20, the block 27 is received in the oval shaped opening with the annular plate 28 of the key device lying flush with the edge of the annular flange 15. That portion on the face of the ring 14 which is left after producing the oval shaped opening provides a confine wall 29 for the pins 24 at opposite sides of the ring face. The key device is also provided with a nut shaped wrench engaging part 30 so that after the same has been presented to the device with the studs 26 introduced into the recesses 26 the wrench may be applied to the part 30 for turning the device in either a clock wise or an anti clock wise direction to run the same in either direction on the threaded end 6. Of course it must be understood that the entire casing will not turn but merely the annular ring 14 especially in unscrewing the device as the set screw 18 is received in the recesses 19 and locking the casing as well as the ring 12 against rotation.

Having thus described my invention what I claim as new and desire to secure by Letters Patent is as follows:—

1. In a locking device of the character described, a casing having outer axial bores, and an inner enlarged axial bore communicating with said outer bores, a rotatable core disposed within said inner bore and having an axial threaded bore adapted to coact with the threaded extremity of a spindle passed through one of the outer bores, means for normally retaining the casing against independent rotation with respect to the spindle, and means for locking the rotatable member against rotation with respect to said casing.

2. In a locking device of the character described, a casing having outer axial bores and an inner enlarged axial bore communicating with said outer bores, the juncture of said bores constituting shoulders having recesses formed therein, a rotatable core disposed within said outer bore and having an axially threaded bore adapted to coact with a threaded spindle passed through one of the outer bores and provided with a plurality of recesses arranged parallel to said threaded bore, means for normally retaining the casing against independent rotation with respect to the spindle and means for locking the rotatable member against rotation with respect to said casing, said means comprising spring pressed pins arranged within the first mentioned recesses and adapted to be projected into the remaining recesses when brought in register therewith.

3. In a device of the character described, a casing, rotatable and non-rotatable members in said casing having axial bores, the bore of the rotatable member being threaded and made to receive the threaded end of bolt or spindle, with the spindle passed through the bore in the non rotatable member, means for normally maintaining the casing and the non rotatable member in fixed relation relative to the bolt or spindle, and means for locking the rotatable member to said non rotatable member, comprising recesses in the non rotatable member, pins in said recesses, and recesses in the rotatable member adapted to receive said pins, and means for displacing said pins from the recesses in the rotatable member, comprising a series of like pins carried in the recesses of the rotatable member and abutting against the said first mentioned pins, and means detachably engaging the device for manipulating said last mentioned pins to impart a thrust thereto and in turn to said first mentioned pins.

4. In a device of the character described, and as set forth in claim 3, and in which the means for normally maintaining the casing and the non rotatable member in fixed relation relative to the bolt or spindle comprises a set screw carried by the non rotatable member with its end protruding longitudinally of and beyond the edge of the casing, and adapted to be received in an opening in a structure associated with the bolt or spindle.

5. In a device of the character described, and as set forth in claim 4, and in which the non rotatable member has a threaded engagement with the interior of the casing, and in which a plate or the like has a threaded engagement with the casing for confining the non rotatable member therein.

GEO. W. BURTON.